US007026006B1

(12) United States Patent
McArthur et al.

(10) Patent No.: US 7,026,006 B1
(45) Date of Patent: Apr. 11, 2006

(54) DEHYDRATED MASH POTATO PROCESS

(75) Inventors: William H. McArthur, Pocatello, ID (US); Steven D. Elliott, Blackfoot, ID (US); Kimberly A. Killian, Shelley, ID (US)

(73) Assignee: Basic American, Inc., San Francisco, CA (US)

( * ) Notice: Subject to any disclaimer, the term of this patent is extended or adjusted under 35 U.S.C. 154(b) by 0 days.

(21) Appl. No.: 10/821,419

(22) Filed: Apr. 9, 2004

Related U.S. Application Data

(63) Continuation of application No. 10/683,572, filed on Oct. 9, 2003, now abandoned.

(51) Int. Cl.
*A23L 1/216* (2006.01)

(52) U.S. Cl. .................. 426/637; 426/464; 426/516; 426/519

(58) Field of Classification Search ................ 426/637, 426/519, 454, 464, 516
See application file for complete search history.

(56) References Cited

U.S. PATENT DOCUMENTS

| | | | |
|---|---|---|---|
| 3,407,080 | A | 10/1968 | Rainwater et al. |
| 3,458,325 | A | 7/1969 | Beck et al. |
| 3,459,562 | A | 8/1969 | Beck et al. |
| 3,764,716 | A | 10/1973 | Rainwater et al. |
| 3,809,758 | A | 5/1974 | Mathias et al. |
| 5,292,542 | A | 3/1994 | Beck et al. |
| 5,536,525 | A | 7/1996 | Mogilevsky et al. |
| 6,177,116 | B1 | 1/2001 | Villagran et al. |
| 6,197,358 | B1 | 3/2001 | Bunker |
| 6,312,747 | B1 | 11/2001 | Villagran et al. |
| 6,432,463 | B1 * | 8/2002 | Bhaskar et al. ............. 426/496 |
| 6,558,730 | B1 | 5/2003 | Gisaw et al. |
| 6,599,547 | B1 | 7/2003 | Martinez-Serena Villagran et al. |

FOREIGN PATENT DOCUMENTS

| | | |
|---|---|---|
| EP | 0 538 125 | 7/1997 |
| WO | WO 85/03204 A1 | 8/1985 |
| WO | WO 02/07535 A2 | 1/2002 |
| WO | WO 02/07535 A3 | 1/2002 |
| WO | WO 02/07536 A2 | 1/2002 |
| WO | WO 02/07536 A3 | 1/2002 |
| WO | WO 02/07537 | 1/2002 |
| WO | WO 02/07538 A2 | 1/2002 |
| WO | WO 02/07538 A3 | 1/2002 |
| WO | WO 02/07539 A2 | 1/2002 |
| WO | WO 02/07539 A3 | 1/2002 |
| WO | WO 02/26050 A2 | 4/2002 |
| WO | WO 02/26050 A3 | 4/2002 |

OTHER PUBLICATIONS

Alvarez, M.D., et al., "Rheological properties of mashed potatoes made from dehydrated flakes: effect of ingredients and freezing," *Eur. Food Res. Technol.* 209(5):335-342 (1999).

* cited by examiner

*Primary Examiner*—Arthur L. Corbin
(74) *Attorney, Agent, or Firm*—David J. Brezner, Esq.; Dorsey & Whitney LLP

(57) ABSTRACT

Dehydrated potato pellets are made by preparing an aqueous mixture of dried potato pieces, an emulsifier, and oil, and, optionally, a freshly cooked potato, homogenizing the mixture to produce a pumpable, flowable aqueous dispersion, mixing the dispersion with more dried potato pieces and, optionally, freshly cooked potatoes, forming the mixture into pellets, and drying them.

16 Claims, No Drawings

DEHYDRATED MASH POTATO PROCESS

CROSS-REFERENCE TO RELATED APPLICATION

This application is a continuing application of U.S. application Ser. No. 10/683,572 filed Oct. 9, 2003, now abandoned.

BACKGROUND OF THE INVENTION

Dehydrated mashed potatoes have been commercially available for many years. Many of these products are based on either potato flakes or potato granules. Consumers of mashed potatoes prefer the rehydrated (reconstituted) potatoes to include soft potato lumps characteristic of fresh mashed potatoes. In an attempt to duplicate the fresh mashed potato product, potato bits (e.g., crushed dehydrated diced potatoes) have been added to potato flakes or granules or a puree mix. However, mashed potatoes produced from such mixtures include firm, not fully rehydrated, potato chunks rather than the soft lumps. Moreover, the rehydration preparation time is substantially extended to reconstitute the potato pieces.

Various methods have been suggested for making quick-reconstituting dehydrated mashed potatoes. For Example, Mathias, et al, U.S. Pat. No. 3,809,758 discloses a method of making clusters of dehydrated potato agglomerates by contacting a bed of dehydrated potatoes with an aqueous binding solution containing milk solids to form clusters which are subsequently dried.

Rainwater, et al U.S. Pat. No. 3,764,716 discloses a process for producing a dehydrated mashed potato product from incompletely peeled and trimmed potatoes, including the steps of mashing, slurrying, screening, and dehydration.

Beck, et al U.S. Pat. No. 3,459,562 discloses a process for production of instant mashed potato products of varied bulk densities from a foamed slurry of cooked potato solids.

Beck, U.S. Pat. No. 3,458,325 discloses a process for production of instant mashed potato products by mixing potato granules and flakes, moistening to form a damp intermediate, and drying.

Rainwater, et al U.S. Pat. No. 3,407,080 discloses dried agglomerated foods and the process for manufacturing. The process includes the steps of foaming a slurry, extruding the foam to form discrete pieces, coating the foam pieces with dry particles, and drying.

Beck, et al U.S. Pat. No. 5,292,542, discloses a process for making dehydrated mashed potato products by mixing potato flakes with water to moisten, reducing the product temperature and holding for a time long enough to effect retrogradation of free starch, reducing the size of the potato flakes, and drying.

One method to produce dried potato mash which is not directly based on flakes or granules is proposed in Grufstedt, et al. publication WO 85/03204. It is not believed that this process was ever commercialized. The Grufstedt publication disclosed precooking, cooling and cooking potatoes as performed in producing potato mash powder (potato granules) and potato mash flakes. Then, the product is disintegrated by straining through a screen device or through a perforated plate, followed by drying and comminution. The publication discloses reconstitution in boiling water, which suggests a temperature intolerance for reconstitution. This water temperature intolerance is an undesirable trait for a commercial dehydrated mashed potato product.

Another dehydrated mash potato product which has been commercialized is disclosed in U.S. patent application Ser. No. 10/245,841 filed Sep. 17, 2002. entitled Dehydrated Mash Potato Product & Process.

SUMMARY OF THE INVENTION

In one embodiment of the present invention, dehydrated potato pellets are made by a method comprising the steps of
(a) preparing an aqueous mixture of a first portion of dried potato pieces, said mixture including an emulsifier, water, and, optionally, a first portion of comminuted freshly cooked potato,
(b) homogenizing the mixture of step (a) to produce a homogenate comprising potato and emulsifier uniformly dispersed in a pumpable, flowable aqueous dispersion,
(c) mixing the homogenate of step (b) with a second portion of dried potato pieces,
(d) forming the mixture of step (c) into pellets, and
(e) drying said pellets.

Another embodiment of the invention comprises dried potato pellets rehydratable into mashed potato, said pellets comprising at least about 2% oil uniformly dispersed within said pellets.

Another embodiment of the invention comprises a homogenized pumpable, flowable stable aqueous dispersion comprising uniformly dispersed and substantially completely rehydrated, dried potato pieces, emulsifier and oil.

DETAILED DESCRIPTION OF PREFERRED EMBODIMENTS

As an overview, the present invention relates to a method for making dehydrated potato pellets comprising the steps of preparing an aqueous mixture of a first portion of dried potato pieces, said mixture including an emulsifier, water, and, optionally, a first portion of comminuted freshly cooked potato. Then the mixture is homogenized to a pumpable, flowable aqueous dispersion. The homogenate is mixed with a second portion of dried potato pieces and formed into pellets and dried. The invention can utilize one of three different process options, depending on the desired feedstock and finished-product texture.

The first option utilizes dry potato ingredients (i.e. no fresh potatoes) as a feedstock to the process wherein the finished rehydrated ready-to-eat mash exhibits a smooth texture without significant lumps. In this process, ingredients are homogenized, mixed, formed into pellets, and dried.

A second option utilizes fresh potato as well as dry potato ingredients as a feedstock to the process wherein the finished rehydrated ready-to-eat mash exhibits a smooth texture without significant lumps. In this process, ingredients are homogenized, mixed, formed into pellets, and dried.

A third option utilizes fresh potatoes as well as dry potato ingredients as a feedstock to the process wherein the finished rehydrated ready-to-eat mash exhibits a texture with lumps similar to mash made from fresh potatoes. In this process, the prepped fresh potatoes are subdivided into two streams wherein one stream is optionally riced and responsible for providing lumps. The second stream is homogenized. Both streams are subsequently recombined, mixed with additional ingredients, formed into pellets, and dried.

For the second and third options using fresh potatoes, partially or fully peeled fresh potatoes are cooked, optionally riced, and separated into two fractions (with one fraction being homogenized with additional ingredients), mixed with additional ingredients, formed, and dried. Any commercially available potato variety may be used. Such varieties include Russett Burbank, Russet Norkotah, Shepody, Ranger, Umatilla, Alturas, Cal White, Norchip, Norgold, Snowden, Ida Rose, and Cal Rose.

Partially to fully peeled fresh potatoes can be cooked and cooled. The process of cooking and cooling is well known in producing potato granules or potato flakes. Such methods are disclosed in Talburt and Smith, *Potato Processing* (4$^{th}$ Ed.).

Fresh potatoes are typically subjected to a variety of unit operations that may include washing, derocking, peeling, trimming, and cutting as disclosed in *Potato Processing*. Thereafter, the potatoes may be subdivided as by cutting into slabs or other smaller forms such as slices, dices, shreds, or strips prior to cooking.

In one embodiment using freshly cooked potatoes, the potatoes are cut into ⅝- to ¾-inch thick slabs that may be cooked in order to inactivate enzymes, swell the potato cells, soften intercellular bonds and the like as performed in the flake and granule industry. The thinner the potato pieces, the shorter the cook time. The cook time and amount of steam used will depend on many factors such as the potato variety, age, piece size, loading and type of cooking equipment. Suitable commercial cook conditions for potato slabs using saturated steam cooking at atmospheric pressure are from 20 to 90 minutes, preferably 30 to 60 minutes. Cooling under pressure will reduce the cooking time. As disclosed, cooking and mashing may be accomplished with a single unit such as, a twin-screw cooker with a discharge auger with a mashing plate at the discharge end. During cooking, the starch cells preferably are fully swollen but with minimal free starch. If the potato is overcooked, the cells tend to burst producing free starch. Conversely, if the potatoes are undercooked, the derived potato product will not rehydrate adequately to provide a product that simulates fresh mashed potatoes. Cooking is preferably sufficient to deactivate peroxidase and to leave lumps in the rehydrated mash while permitting rehydration within about 5–15 minutes.

At this point, if lumps are desired, the potatoes are subdivided into two streams. The first stream may be sent to a cooling step or maintained at a hot temperature; this material will be optionally riced and be responsible for providing lumps. The second stream will be referred to as the homogenate; this material is responsible for providing the adhesive material that will bind the product together through the extruder, dryer, and in the finished product. In addition, the homogenate will provide the smooth texture component to the mash.

Regarding the first of the subdivided streams, the potatoes may either be cooked and then optionally riced or cooked-cooled-riced. In one option, potatoes may be cooled, e.g., using water with an inlet temperature of about 15° C. and an outlet temperature of about 24° C. for a time of 12 minutes. The cooling step serves to retrograde or harden starch cells, stop the cooking process, and maintain cell structure—both intercellular and intracellular—providing a group of cells that is distinguished as a lump or bit with a bite which can be varied from soft to firm in the finished mash. If desired, the potatoes may be cycled through a second cook and cool operation. This serves the purpose of additionally hardening the starch cells. Proper cooling can be important to the creation and maintenance of lumps with a firmer bite in the finished products. An optional next stage of the process is comminuting the fresh potato. Comminuting as defined herein is similar to the mashing term used in the potato industry in which the cooked potato products are forced through a "masher" or "ricer" on the order of ⅜-inch opening in circular holes or slots to provide a mixture of chunks and mash. Mashing is described on pages 575–576 and illustrated in FIG. 13.7 of *Potato Processing*. Comminution also includes non-comminutive pressing that results in a size reduction. As disclosed, cooking and mashing may be accomplished with a single unit such as, a twin-screw cooker with a discharge auger with a mashing plate at the discharge end. This fraction of the potato stream is referred to as the comminuted fresh potatoes.

The terms "comminuting", "ricing" and "mashing" and variants of these terms are used interchangeably herein. Comminuted potatoes as used herein refer to comminution of cooked potatoes and excludes comminution of previous dehydrated potatoes. Comminution can be accomplished prior to homogenization and mixing such as by ricing or mashing. Alternatively, comminution may be accomplished by the use of appropriate conditions during homogenization or mixing after homogenization.

Regarding the second of the subdivided streams, the potatoes may be homogenized with additional ingredients. As used herein, homogenization refers to the reduction of the particle sizes of the potatoes, and blending with additional ingredients in order to create a mixture comprised primarily of small particles that exhibit smooth texture, as well as, uniform texture and composition. Any equipment in the art that achieves these product characteristics may be used such as mixers, homogenizers, macerators, etc. However, a preferred means of achieving the end result is to use a blender or homogenizer, e.g. Breddo Likwifier™ and/or a ROSS™ Inline Mixer, in conjunction with a Tri-clover™ pump. In a preferred method, homogenate is produced in the following manner: Into a Breddo Likwifier is placed fresh cooked potatoes or dried potatoes, water, oil, titanium dioxide, emulsifiers and sulfite. Fresh potatoes from the homogenate, on a bone dry solids (BDS) basis of the finished product can range from 20% to 85% of the finished product solids, but more preferably from 22% to 55% of the finished product, and most preferably from 25% to 45% of the finished product. When dry potato pieces are used in the homogenate, the BDS content of the homogenate potato pieces in the finished product suitably can range from 1% to 80%, more preferably from 5% to 50%, and most preferably from 10% to 40% of the finished product solids.

Oil is a preferable ingredient added to the product prior to homogenization. It can be used at a total level of from 0% to 20%, preferably 2% to 15%, or 4% to 12%, of the finished product (BDS Basis), more preferably 6% to 10% of the finished product. Oil serves to assist with flavor dispersion, flavor release, rehydration rate control, elasticity of moist pellet or pellet right out of the extruder, emulsifier dispersion, and controlling the rate and manner in which the emulsifier or emulsifiers react. Suitable oils include food grade vegetable or other types of oils, including soybean oil, coconut oil, cottonseed oil, sunflower oil, palm oil, canola oil, corn oil, olive oil, rendered fat, or combinations thereof. A preferred oil is coconut oil with a melting point of about 32° C. Suitably the oil is mixed with the emulsifier prior to homogenization. Preferably, the oil is added in a quantity so that at least 2.0%, 2.5%, 3.0%, 3.5%, 4.0%, 4.5%, 5.0%, 6.0% or more of the oil is uniformly dispersed in the pellets after drying. The term "uniformly dispersed" excludes enrobing of the pellets with oil. However, the total oil content can be increased by enrobing or by adding the oil in dry form.

Emulsifier also is added prior to homogenization. Emulsifier serves the functions of a surfactant or HLB (Hydrophilic/Lipophilic Balance) and starch crystal stability and starch complexing and instantizing. Any of the well-known food grade emulsifiers may be used. Suitable emulsifiers include monoglycerides, mixtures of mono- and diglycerides, and derivatives thereof, including DATEM (diacetyl tartaric acid esters of mono- and diglycerides). One such additive that is particularly advantageous is a lubricant, e.g., an emulsifier and/or fat that can be added to provide lubricity to reduce the shear on the potato cells passing through the ricing barrier. Emulsifiers such as mono- and di-glycerides (e.g., Dimodan PV manufactured by Danisco USA Inc.), and/or DATEM (e.g. Panodan 150K manufactured by Danisco USA Inc.) in addition to serving as lubricants, also assist in complexing of free starch to aid in the prevention of product stickiness.

Mono- & diglycerides derived from either vegetable or animal fats typically consist of a mixture of predominantly saturated acyl fatty acids including lauric, palmitic, stearic, myristic in combination with unsaturated acyl fatty acids, including oleic, eladic, linoleic and combinations thereof. Mono- & diglycerides typically have a monoglyceride content greater than 40%, preferably greater than 60% and most preferably greater than 90%. In the production of monoglycerides, a triglyceride normally is reacted with glycerol to form a mixture of mono & diglycerides. This process can be carried further to isolate or to concentrate the monoglyceride fraction by molecular distillation. The remaining components, predominantly di & triglycerides are typically recycled back to the reaction with glycerol to make additional monoglyceride.

Thus, it is advantageous to add the lubricants and specifically emulsifiers to the potato mash prior to homogenizing. Preferred emulsifiers used in this invention include Dimodan PV and Panodan 150K. Other suitable emulsifiers include sodium or calcium stearoyl lactylate and lecithin. In general, the emulsifiers function in the manner described in *Food Product Design*, October 1995, "Emulsifier Applications, Design Elements", Scott Hegenbart, Ed. The emulsifier(s) suitably are added in an amount to constitute a percentage of the finished product of 0.005% to 5%, preferably 0.01% to 2%, and more preferably 0.02% to 0.5% on a dry solids (BDS) basis. Emulsifier may be added as independent ingredient or as a component of another ingredient such as flakes or granules.

Titanium dioxide ($TiO_2$) can be added to the homogenate in a dry form, or in an aqueous dispersion.

Ingredients are suitably fed on a continuous basis into a homogenizer set at low speed within the foregoing conditions and held preferably for 1 to 60 minutes, and more preferably for 10 to 40 minutes. Individually, the Breddo Likwifier and the Ross Inline Mixer can function as a homogenizer, causing homogenization of ingredients and mechanical breaking of cooked and swollen potato cells resulting in an emulsion stable enough to deliver the dispersed ingredients in the homogenate to the dry ingredients in the mixing step. The Breddo Likwifier and the Ross Inline Mixer are used in combination for better control of homogenate properties and thereby the intermediate and finished product.

The homogenate is then fed through a pump which meters the flow rate to a Ross Inline Mixer. The Ross Inline Mixer is used to fine-tune the degree of shear imparted to the homogenate.

The degree of homogenization is dependent on the condition of the incoming potato source, the shape of the formed piece, the dryer and dryer conditions, and the desired attributes of the finished product. When the potato is minimally cooked or cooked to a firm state, such as when lumps and fresh feedstock are desired, or dry potato pieces are used, then the degree of shear caused by the homogenizing process will be fairly high. Typical cook conditions for a product with lumps and using fresh feedstock would preferably be 10 to 60 minutes, more preferably 15 to 40 minutes and most preferably 20 to 30 minutes with saturated steam at atmosphere pressure.

Typical process conditions for a product made from dry potato pieces (without fresh potatoes) would retain the same conditions within the homogenizer. If no lumps and fresh feedstock or a high degree of cook is used then the desired degree of shear caused by homogenization can be low.

The degree of homogenization also controls the stickiness of the final rehydrated mash, more stickiness is achieved by increasing the degree of shear during homogenization and less is achieved by decreasing the degree of shear during homogenization. Stickiness can also be controlled by the level, type and time of introduction of emulsifiers used in the homogenate and in the mixer. Balancing the degree of cook with the shear and emulsifier addition allows the ability to balance opposing attributes, in particular, elasticity (or in other words stickiness) of the wet pellet, where as much stickiness as possible is desired in order for the pellet to survive handling and drying, but where minimal stickiness is desired in the finished product. This has been accomplished by shearing the potato cells, allowing the interstitial fluids (containing amylose, very sticky material, and amylopectin, moderately sticky material) to flow out and act as an adhesive.

Expanding on the foregoing description of the emulsifier and its functioning, emulsifier, e.g. mono- and diglycerides, will preferentially react with the amylose, (which is very sticky and contributes to the stickiness in the finished product), then it will react with the amylopectin (which is sticky, but not as sticky as amylose,) and then with the oil. Amylose provided by the shearing of potato cells, both intra and interstitial cell fluids, and the amylose created by the shearing of amylopectin is controlled by providing a limited amount of emulsifiers at the time and shortly after shearing. Reducing the level of amylose will reduce the level of stickiness in the finished product, and conversely, increasing the level of amylose will increase the level of stickiness in the finished product. Controlling the amount of mono and diglycerides will control the amount of amylopectin that will be affected, or made non-sticky, providing adhesive material and elasticity for the pellet in the moist form, while reducing it's tendency to case harden resulting in improved rehydration characteristics. Additionally, some of the mono and diglycerides act as surfactants for the oil within the homogenate. The results are a pellet that is elastic enough to be handled and dried in the wet form and rehydrates easily into a mash with minimal stickiness. If DATEM is used as the emulsifier, it will first act as a surfactant for the oil and then as a starch stabilizer by combining with the amylose and then the amylopectin with similar and complimentary results as those stated above.

The potatoes may or may not be cooled, prior to this step. In the preferred embodiment, hot potatoes are not cooled and are made into a homogenate by blending with water and a heated oil premix (to which multiple ingredients have been mixed-in: e.g., emulsifier, antioxidant, and caseinate), and with subsequently added ingredients (such as sulfite and titanium dioxide).

Some of the additives used provide functional properties well known in the art. For example, a variety of additives known in the industry for incorporation to mash before drying may be employed such as disclosed on pages 576–579 of Potato Processing with respect to potato flakes. Similar additives may be used in the present process.

Antioxidant provides protection against oxidative rancidity development, and although a number of antioxidants might be considered for this purpose (e.g. BHT, BHA, TBHQ, rosemary, etc), it has been found that BHT provides a level of protection for the product of this invention when present in the finished dehydrated product at a level of between about 1 to 25 ppm.

The use of sulfite in potato products is well known in the art and is disclosed in *Potato Processing*.

Caseinate may be added for the purposes of flavor, at a level of about 1%.

Water is added to the mixture in a sufficient amount to provide a pumpable, flowable mixture, and to maintain correct aqueous phase for the emulsifier(s), maintaining starch structure or hydration and hydrating the $TiO_2$. Suitably, sufficient water is added so that the water content of the homogenate at least 50% (w/w), preferably 72%, and more preferably 80% to 85%. As used herein, water content includes all water in the homogenate whether added in liquid form or as part of a solid ingredient such as potato solid. Temperature of the added water preferably is at least 37° C., but more preferably 60° C., and most preferably 76° C.

If oil is used in a premix to be added to the homogenizer, sodium caseinate can be stirred into a heated oil blend for a minimum of 3½ minutes in order to drive off the "Cardboard or Drier" notes. The conditions of homogenization can be important to the finished product quality with the degree of shear controlling the level of "glue" or free starch and thereby the pellet formation and pellet attributes in the dryer and product attributes of the rehydrated mash. In addition, homogenization of the oil, emulsifiers, and free starches are critical to the speed and manner in which the finished product hydrates, resulting in greatly improved mixing characteristics. Homogenization of the free starches, oil, and emulsifiers in the proper form control the water activity and bonding of free starches in such a manner as to allow dry flavors, or encapsulated flavors, to be further encapsulated and thereby extending the shelf life of the product. Additionally, the oil-emulsifier system binds the flavor within the reconstituted mash, changing the degree and speed in which a flavor releases.

The homogenate from this unit operation should exhibit pumpable, flowable characteristics and wherein the solids and oil will not easily separate from the dispersion. As used herein, the term "pumpable" is used in a manner well known in the art, e.g. it is capable of being pumped through pumps, e.g. such as positive displacement pumps that impart minimal shear, e.g. piston pumps. As used herein, "flowable" is used in a manner well known in the art, e.g. it is capable of moving and/or changing form when acted upon by forces, such as by gravity. One measure of flowability is viscosity, for example, as measured on a Bostwick Consistometer wherein suitable viscosities for this viscous fluid measured between 53 and 63° C. e.g., are in the range of between about 6 to 16 centimeters.

At this point, the freshly cooked potatoes may be mixed with additional ingredients such as dry potato ingredients ("potato pieces"), caseinate, salt, and flavors. As used herein, the term "potato pieces" includes previously dried potato ingredients such as potato flakes, granules, flanules, Potato Pearls®, Potato Buds™, Potato Pearls Excel® and potato flours. The potato pieces may also include dehydrated chunks from potato slices, dehydrated potato dices, dehydrated potato shreds wherein they are preferably rehydrated prior to extrusion, e.g. before or during homogenization or during or after mixing with the homogenate, preferably including dry potato granules.

The adhesive material in the process is controlled by the level of mixing during homogenizing. Over-mixing the potato pieces, e.g. granules, and homogenate can produce more adhesive material than is desired resulting in an unacceptable product. Under-mixing results in non-unifom dispersion of the added ingredients. Preferably, mixing is just long enough to uniformly blend the homogenate/granule mixture with the fresh potatoes, salt and flavor.

After mixing, the moist potato mixture is formed by the application of pressure such as by extrusion, e.g., by urging or forcing the material through multiple openings of a forming barrier to create formed moist potato pellets that are thereafter dried. During forming, the moist pellets formed tend to assume the cross-sectional shape of the openings or perforations in the forming device. As used herein, the term pellets includes pieces of any shape geometry, such as cylinders, noodles, spheres, ovoids, strips, dice, and the like. In a preferred embodiment, a low-pressure extruder with a multiplicity of holes ranging in diameter from about 1.6 mm to 9.5 mm and preferably 4.0 mm to form the pellets; a cutoff wire or knife can optionally be used at this point to control pellet length. If desired, the shapes of the openings may be any other configuration such as rectangular, hexagonal, oblong, oval, crescent, or the like. The openings are sized and with adequate open area to minimize the pressure to force the potatoes through the openings which might thereby rupture potato cells releasing excessive potato starch. Other forming devices may be employed such as ricers, sheeter-cutters, roll formers, and the like. An important advantage of forming is to produce a dried product which reconstitutes into a fresh mashed potato-like product with a desired amount of soft lumps as described hereinafter. Any pressure application that accomplishes this is encompassed by the term "forming."

The proportions of potato solids vary depending on the type of product, e.g. (1) one formed without fresh comminuted potato additions, (2) one with such addition but without lumps from fresh potatoes, and (3) one with lumps from fresh potatoes.

Referring to (1), (2) and (3), previously dehydrated potato pieces are added both prior to homogenization and after homogenization. Preferably, the ratio of potato pieces after and before homogenization is from about 99:1 to 0.25:1, more preferably about 19:1 to 1:1, still more preferably about 9:1 to 1.5:1. If flakes are used as the majority of potato pieces, the range tends to be higher while if granules are used as the majority, the range tends to be lower.

Referring to (2) and (3), the ratio of potato pieces to potato from fresh comminuted potatoes BDS suitably is from about 4:1 to 0.2:1 preferably about 3:1 to 1.22:1.

Referring to (3), the ratio of comminuted fresh potatoes which bypasses the homogenizer (and thus contributes to lump formation) to the comminuted fresh potatoes added to the homogenizer suitably is from about 11:1 to 0.6:1, preferably about 9:1 to 3:1 and more preferably about 8:1 to 4.5:1.

The dried (packout) pellets suitably contain about 70 to 99% or more, preferably about 15% to 97% and more preferably 80% to 95% BDS of potato pieces when no comminuted fresh potato is used. Suitably, about 20% to 85%, and preferably 25% to 45% of the packout is from comminuted fresh potato regardless of the amount of fresh potato which bypasses the homogenizer. If there is a bypass of the homogenizer to form lumps, suitably about 70% to 95%, preferably 80% to 90%, of the comminuted fresh potato is the lump producing bypass fraction.

After forming, the product may be dried under conventional conditions, for example using fluid bed dryers and/or traveling belt dryers. Drying typically occurs in hot-air forced-convection dryers wherein the product moisture is reduced from about 47%–65% moisture (w/w) down to 5%–10% (w/w) moisture, and more preferably 7% to 9%. Suitable conditions are as follows: The initial drying steps can be conducted in a conventional fluid-bed dryer, e.g., with initial-stage dryer air temperatures of approximately 120° C., and finish-drying at approximately 65° C. Dry time can vary from between about 10 and 60 minutes depending on many factors such as drier design, air temperature, air velocity, air humidity, product moisture content, etc.

The product made by the foregoing process has desirable characteristics mimicking fresh mashed potatoes upon reconstitution in hot water. Thus, a mashed potato product reconstituted in water at 82° C. under light stirring conditions includes a quantity of soft lumps, when desired, that are very similar to lumps found in fresh mashed potatoes.

Another advantage of the product of the present invention is its rapid reconstitution in water to a ready-to-eat mashed potato product. Thus, at a water temperature of 82° C. under light stirring conditions, the product can be made into a mashed potato with soft lumps in less than about 15, 10, 7, 5, 3, 1 minutes or less.

A further advantage of the product is its wide range of acceptable water temperatures for rehydration. The span of this water temperature range is best seen when compared to other conventional dehydrated mashed potato products. Thus, the dehydrated product of the invention reconstitute acceptably with rehydration water temperatures of between about 54° C. and boiling. In comparison, flake-based and granule-based products exhibit a narrow range of water temperature for rehydration. The tolerance of water temperature for rehydration for flake-based products is in the range of about 38° C. to about 77° C. The tolerance of water temperature for rehydration for granule-based products is in the range of about 82° C. to boiling. Thus, the product of this invention spans the water rehydration temperature tolerance range between flake-based and granule-based products, and overlaps the water rehydration temperature tolerance portions of both flake-based and granule-based products. This is an important characteristic of the product for foodservice sales because a hot water dispenser is typically available, and the water from these dispensers usually ranges from 71° C. to 93° C.

A further advantage of the product is that its flavor system when incorporated in the dough is uniformly distributed throughout the product prior to extrusion and drying and so uniformly distributed in the dried pellets. Such uniformly distributed flavors are significantly more stable than the flavor held separate or stored with the pellets. In the latter case, the starches from the potatoes, both amylose and amylopectin in conjunction with the oil and emulsifiers appear to form a second layer of encapsulation to the added dry flavor. This has resulted in improved shelf life of the dehydrated product, i.e. product stored at 21° C. for 12 months is judged equal to a frozen control. Additionally, when oil is added to the homogenate and flavor to the dough and extruded together the oil and flavor are uniformly distributed and flavor the character and release rate of flavor in the rehydrated mash is improved.

Additionally, the product has advantages for mixing tolerance. The product and water can be lightly stirred or machine mixed with favorable results. In comparison to prior art, potato-flake-based products can be hand-mixed, but when machine-mixed, they tend to become sticky or gelatinous. On the other hand, granule-based products are typically machine-mixed for the best results.

In order to illustrate the present invention, examples of its practice are given.

EXAMPLE 1

This example illustrates the present invention to produce a dehydrated mashed potato product (with lumps) made with a fresh potato component.

1. Russet Norkotah potatoes are washed to remove soil and to reduce the microbiological load. These potatoes are then peeled and cut into ¾-inch slabs in an Urschel Model B cutter.

2. Pieces are then cooked in saturated steam at atmospheric pressure for 14 minutes, cooled in water for 12 minutes (water temperature at 60° F.), and then riced through ⅜-inch circular holes. The product from this unit operation is then subdivided into two separate fractions, to be processed separately.

3. The first fraction of product from step 2 is referred to as the riced potatoes.

4. The second fraction of product from step 2 is used to make a homogenate by the following procedure:
   a. Coconut oil is heated to 43° C.
   b. 36.156 grams (i.e., 10% w/w) of the preheated oil from the preceding step is transferred into a separate vessel, and a total of 2.8704 grams of emulsifiers (mono & diglycerides and DATEM) are mixed in.
   c. A blend of oil and emulsifiers is prepared by combining 10% (w/w) of the oil blend from step 4b with 90% of the original oil from step 4a.
   d. 0.20 grams of BHT are added to the oil blend from step 4c and stirred for 10 minutes until the mixture is homogeneous.
   e. To 361.56 grams of this heated oil, 54.84 grams of sodium caseinate are added and stirred for an additional five minutes.
   f. Into each of 3 individual Waring Heavy Duty Laboratory 4 Liter Blenders, the following ingredients are placed: 1315.80 grams of riced potatoes, 1105.25 grams of water (at a minimum of 76° C.), 5.13 grams of titanium dioxide, and 361.56 grams of the oil blend (from step 4e). The mixture is blended at the high setting for 12 seconds. Following this, 3.29 grams of sodium bisulfite are added and the blender "pulsed" for one second. This final material is referred to as the homogenate.

5. The product is then mixed by the following procedure:
   a. Into a Hobart Mixer, Model T-801 with paddle attachment, 8636.33 grams of dehydrated potato granules are added and blended for 10 seconds on Speed 1 while all the Homogenate from the 3 blenders of step 4f is added.
   b. Into a Hobart Mixer, Model V-1401 UH, 26150.16 grams of riced potatoes are added from step 3, as was all of the Granule/Homogenate mixture from step 5a. This is mixed with a paddle for 5 seconds. A flavor blend (e.g., salt, butter, and dairy flavors) is then added to the mixer and blended for an additional 5 seconds.

6. Pellets are then formed in a low-pressure extruder through a multiplicity of circular extrusion holes of ⁵⁄₃₂-inch diameter. Pellet length is controlled with cutoff knives, which form pellets of random length.

7. Pellets are then dried in a laboratory-scale fluid-bed dryer for 16 minutes at 93° C. air temperature and an additional 16 minutes at 66° C. air temperature. The final moisture content of the pellets is 7%.

To the product made by the above process, hot water is added and the product is then mixed with a wire whisk and is ready to serve at 5 minutes reconstitution time. The taste and texture is similar to fresh cooked mashed potatoes.

EXAMPLE 2

This example illustrates the present invention to produce a dehydrated mashed potato product (without lumps) made with a fresh potato component.

1. Russet Burbank Potatoes are washed to remove soil and to reduce the microbiological load. These potatoes are then peeled and cut into ⅝-inch slabs in an Urschel Model B cutter.

2. Pieces are then cooked in saturated steam at atmospheric pressure for 18 minutes and then riced through ⅜-inch circular holes.

3. The product from step 2 is used to make a homogenate by the following procedure:
   a. Coconut oil is heated to 43° C.
   b. 36.156 grams (i.e., 10% w/w) of the preheated oil from the preceding step are transferred into a separate vessel, and a total of 2.8704 grams of emulsifiers (mono & diglycerides and DATEM) are mixed in. The oil is heated to 79° C. and subsequently cooled to 43° C.
   c. A blend of oil and emulsifiers is prepared by combining 10% (w/w) of the oil blend from step 4b with 90% of the original oil from step 4a.
   d. 0.02 grams of BHT are added to the oil blend from step 4c and stirred for 10 minutes until the mixture is homogeneous.
   e. To 361.56 grams of this heated oil, 54.84 grams of sodium caseinate are added and stirred for an additional five minutes.
   f. Into each of 9 individual Waring Heavy Duty Laboratory 4 Liter Blenders, the following ingredients are placed: 1315.80 grams of riced potatoes, 1105.25 grams of water (at a minimum of 76° C.), 5.13 grams of titanium dioxide, and 361.56 grams of the oil blend (from step 4e). The mixture is blended at the high setting for 14 seconds. Following this, 3.29 grams of sodium bisulfite are added and the blender "pulsed" for one second. This final material is referred to as the homogenate.

4. The product is then mixed by the following procedure:
   a. Into a Hobart Mixer, Model T-801 with paddle attachment, 12020 grams of dehydrated potato granules are added and blended for 10 seconds on Speed 1 while all the homogenate from the 9 blenders of step 4f is added.
   b. A flavor blend (e.g., salt, butter, and dairy flavors) is then added to the mixer and blended for an additional 5 seconds.

5. Pellets are then formed in a low-pressure extruder through a multiplicity of circular extrusion holes of 5/32-inch diameter. Pellet length is controlled with cutoff knives, which form pellets of random length.

6. Pellets are then dried in a laboratory-scale fluid-bed dryer for 16 minutes at 93° C. air temperature and an additional 16 minutes at 66° C. air temperature. The final moisture content of the pellets is 7%.

To the product made by the above process, hot water is added and the product is then mixed with a wire whisk and is ready to serve at 5 minutes reconstitution time. The taste and texture is similar to fresh cooked mashed potatoes.

EXAMPLE 3

This example illustrates the present invention to produce a dehydrated mashed potato product (without lumps) made with only dehydrated (i.e., no fresh) potato components.

1. A homogenate is prepared by the following procedure:
   a. Coconut oil is heated to 43° C.
   b. 36.156 grams (i.e., 10% w/w) of the preheated oil from the preceding step are transferred into a separate vessel, and a total of 2.8704 grams of emulsifiers (mono & diglycerides and DATEM) are mixed in. The oil is heated to 79° C. and subsequently cooled to 43° C.
   c. A blend of oil and emulsifiers is prepared by combining 10% (w/w) of the oil blend from step 4b with 90% of the original oil from step 4a.
   d. 0.02 grams of BHT are added to the oil blend from step 4c and stirred for 10 minutes until the mixture is homogeneous.
   e. To 361.56 grams of this heated oil, 54.84 grams of sodium caseinate are added and stirred for an additional five minutes.
   f. Into each of 9 individual Waring Heavy Duty Laboratory 4 Liter Blenders, the following ingredients are placed: 250 grams of granules, 2171.05 grams of water (at a minimum of 76° C.), 5.13 grams of titanium dioxide, and 361.56 grams of the oil blend (from step 4e). The mixture is blended at the high setting for 30 seconds. Following this, 1.65 grams of sodium bisulfite are added and the blender "pulsed" for one second. This final material is referred to as the homogenate.

2. The product is then mixed by the following procedure:
   a. Into a Hobart Mixer, Model T-801 with paddle attachment, 12019.91 grams of dehydrated potato granules are added and blended for 10 seconds on Speed 1 while all the Homogenate from the 9 blenders of step 4f is added.
   b. A flavor blend (e.g., salt, butter, and dairy flavors) is then added to the mixer and blended for an additional 5 seconds.

3. Pellets are then formed in a low-pressure extruder through a multiplicity of circular extrusion holes of 5/32-inch diameter. Pellet length is controlled with cutoff knives, which form pellets of random length.

4. Pellets are then dried in a laboratory-scale fluid-bed dryer for 16 minutes at 93° C. air temperature and an additional 16 minutes at 66° C. air temperature. The final moisture content of the pellets is 7%.

To the product made by the above process, boiling water is added, and briefly stirred. After 5 minutes, it is then machine-mixed for 9 seconds at high speed in a Hobart mixer. The taste and texture is similar to fresh cooked mashed potatoes.

What is claimed is:

1. A method for making dehydrated potato pellets comprising the steps of
   (a) preparing an aqueous mixture of a first portion of dried potato pieces, said mixture including an emulsifier, water, and, optionally, a first portion of comminuted freshly cooked potato,
   (b) homogenizing the mixture of step (a) to produce a homogenate comprising potato and emulsifier uniformly dispersed in a pumpable, flowable aqueous dispersion, the water content of said homogenate comprising at least 50% of said homogenate,
   (c) mixing the homogenate of step (b) with a second portion of dried potato pieces,
   (d) forming the mixture of step (c) into pellets, and (e) drying said pellets to a moisture content no greater than 10%, said pellets being rehydratable to mashed potatoes.

2. The method of claim 1 in which the mixture of step(a) further comprises oil.

3. The method of claim 2 in which said oil in said homogenate is in a stable emulsion with said water.

4. The method of claim 1 in which said step (a) mixture comprises a fresh cooked potato first portion.

5. The method of claim 4 in which the first portion is cooked and cooled prior to step (a).

6. The method of claim 1 in which the water content comprises at least about 60% of said homogenate.

7. The method of claim 1 at least about 2% oil is uniformly dispersed within said pellets.

8. The method of claim 7 in which said dried pellets are rehydrated into a lumpy mashed potato.

9. The method of claim 1 further comprising the step of
(f) mixing a second portion of freshly cooked potato with said homogenate prior to forming.

10. The method of claim 9 in which said second portion is cooked and cooled prior to step (f).

11. The method of claim 1 in which said forming is performed by extrusion.

12. The method of claim 1 in which at least about 0.005% of said emulsifier is present in said dried product.

13. The method of claim 1 in which said potato pieces are substantially completely rehydrated in said homogenate.

14. The method of claim 1 in which said dried pellets include at least about 20% of the solids content from freshly cooked potato.

15. The method of claim 1 in which said dried potato pieces comprise pieces selected from the group consisting of flakes, granules, and flanules.

16. The method of claim 1 further comprising adding flavor agent prior to forming and in which said dried pellets rehydrate into a mashed potato having substantially uniform flavor distribution.

* * * * *

UNITED STATES PATENT AND TRADEMARK OFFICE
CERTIFICATE OF CORRECTION

PATENT NO. : 7,026,006 B1  
APPLICATION NO. : 10/821419  
DATED : April 11, 2006  
INVENTOR(S) : William H. McArthur, Steven D. Elliott and Kimberly A. Killian It is certified that error appears in the above-identified patent and that said Letters Patent is hereby corrected as shown below:

At Col. 13, in Claim 7, at line 14, after "claim 1", insert --wherein--.

At Col. 14, in Claim 16, at line 16, delete "in which" and insert --wherein--.

Signed and Sealed this

Tenth Day of October, 2006

JON W. DUDAS  
*Director of the United States Patent and Trademark Office*